United States Patent [19]

Swank et al.

[11] 4,085,327
[45] Apr. 18, 1978

[54] DIRECT CHARGE READOUT ELECTRON RADIOGRAPHY APPARATUS WITH IMPROVED SIGNAL-TO-NOISE RATIO

[75] Inventors: Robert K. Swank; Kei-Hsiung Yang, both of Schenectady, N.Y.

[73] Assignee: General Electric Company, Schenectady, N.Y.

[21] Appl. No.: 759,427

[22] Filed: Jan. 14, 1977

[51] Int. Cl.² ............................................. G01T 1/22
[52] U.S. Cl. .............................. 250/370; 250/213 VT
[58] Field of Search ......................... 250/213 VT, 370

[56] References Cited

U.S. PATENT DOCUMENTS

| 3,564,245 | 2/1971 | Koehler | 250/370 |
| 3,970,844 | 7/1976 | Fenn et al. | 250/213 VT |

*Primary Examiner*—Harold A. Dixon
*Attorney, Agent, or Firm*—Geoffrey H. Krauss; Joseph T. Cohen; Jerome C. Squillaro

[57] ABSTRACT

An improved direct charge readout electron radiography apparatus of the type having an upper electrode receiving differentially-absorbed X-radiation, a lower electrode including a plurality of parallel transparent, conductive strips overlaid with a layer of photoconductive material; and means for scanning a beam of light through the transparent strips and into the overlying photoconductive material layer for selectively transferring charge patterns induced therein responsive to the pattern of differentially-absorbed X-radiation, utilizes at least one lead means strip, positioned substantially transverse to, and spaced from the ends of, the plurality of conductive strips. The transverse lead means strip is connected to sequential ones of the parallel strips responsive to illumination of the photoconductive material in the area between the transverse strip and an adjacent end of each sequential parallel strip. The reduction in device capacitance in parallel with a device output signal, facilitates an increase of about 100 times in the amount of readable charge, for equal exposures. Apparatus for optically scanning each conductive strip; while maintaining the connection thereof to the transverse lead means, is also disclosed.

39 Claims, 8 Drawing Figures

DIRECT CHARGE READOUT ELECTRON RADIOGRAPHY APPARATUS WITH IMPROVED SIGNAL-TO-NOISE RATIO

BACKGROUND OF THE INVENTION

The present invention relates to radiographic apparatus and, more particularly, to apparatus for direct charge readout electron radiography apparatus having an improved electrode for increasing signal-to-noise ratio.

Radiography, particularly for medical diagnostic purposes, has been hampered by the need to record images on silver-based films, which are not only expensive but also require large storage volume therefor. One metod advanced for obtaining a radiograph without utilizing a film, causes a pattern of electrical charge to be deposited on the surface of a member, responsive to X-radiation differentially absorbed by an object to be analyzed. The two-dimensional surface of the member is scanned and the electronic charge at each scanned point is read out as an electrical signal capable of being processed by computer techniques. Known computer techniques can be applied to reconstruct, view and/or store the image. In particular, the reconstructed image can be developed by electrostatic and the like methods (eliminating the need for more-costly silver halide films) and can be modified in size to simplify the storage of the image. Known apparatus for accomplishing the conversion of X-radiation to electric charge, with subsequent readout of the charge, generally exhibit a signal-to-noise ratio which is not large enough for practical application of the apparatus with low radiation dosage.

STATE OF THE ART

Apparatus for direct charge readout electron radiography is disclosed in U.S. Pat. No. 3,970,844, issued July 20, 1976 to J. B. Fenn, Jr. et al., which patent disclosures (in FIG. 1 thereof) an upper electrode 21 illuminated by differentially-absorbed X-radiation; a chamber 35 beneath the upper electrode and filled with a gas, such as xenon and the like at high pressure; and a lower electrode 23 forming the boundary of chamber 35 opposite upper electrode 21. The lower electrode has a layer 42 of a photoconductor material evaporated upon a plurality of parallel, transparent, conductive strips 41 supported by a transparent glass substrate 40. During exposure to differentially absorbed X-rays, a field is formed across the gas chamber 35 by an imaging power supply 24 coupled between upper electrode 21 and all of the conductive strips 41 connected in parallel via a single conductor 26. X-ray photons are converted into ions and electrons in the high pressure gas in chamber 35 and one species of the resulting charged particles is attracted to, and deposited upon, the surface of the photoconductive layer. After radiation exposure, the field between upper electrode 21 and lower electrode 23 is removed; a light source 43 is scanned through the transparent strips 41 to regions of the photoconductor layer. The illuminated regions are rendered conductive and the charge stored in each region flows to the underlying conductor 41 and thence to readout electronics 31 for processing, storage and/or reproduction of an image of the object to be studied.

All of underlying conductors 41 are in electrical parallel connection, whereby the device output capacitance is relatively large and the magnitude of each output current signal is relatively small and comparable to the noise current of a following amplifier, to achieve a relative low signal-to-noise ratio. The device output must be increased to achieve desirably low patient dosage per exposure while obtaining a satisfactory radiograph.

BRIEF SUMMARY OF THE INVENTION

In accordance with the invention, direct charge readout electron radiography apparatus having a first electrode upon which differentially-absorbed X-radiation impinges, means, positioned adjacent the opposite side of the first electrode from an X-ray source, for converting the differentially-absorbed X-radiation to a pattern of charge; and a second electrode, positioned adjacent to the charge-producing means and spaced from the first electrode, for selectively reading out the pattern of charge responsive to an optical scanning signal, includes the improvement wherein the second electrode further comprises at least one conductive member disposed substantially transverse to the direction of the plurality of elongated strips and spaced a small distance from the set of parallel strip ends. Each of the parallel conductive strips is initially disconnected from the transversely-disposed lead means strip. Connection between each single one of the conductive strips and the transverse strip is achieved only when the area of photoconductor therebetween is illuminated by a portion of the light being utilized to sequentially scan each of the parallel conductive strips for charge readout purposes. Thus, the total device capacitance, as seen by an amplifier coupled to the transverse strip, is reduced with the readable charge pulse being increased by about 100 times, whereby amplification of the electrical signal is achieved without corresponding increase of the noise to an unacceptable level.

In one preferred embodiment of the invention, a laser is utilized as a light source, with a beam splitter being positioned to direct a stationary spot of light upon the area between the end of one conductor strip and the adjacent transverse strip, for connection purposes. The remainder of the laser output beam is scanned along the length of the same conductive strip by a rotating mirror to facilitate readout of the charge stored above that strip.

In another preferred embodiment, the plurality of parallel, conductive and transparent strips are complemented by an interlaced mesh having relatively large conductor width-to-conductor spacing dimensions, with the mesh being buried under an insulating layer and held at a potential, during X-ray exposure, to allow charge to be collected primarily in the vicinity of the mesh and further reduce device capacitance.

Accordingly, it is one object of the present invention to provide an improved second electrode for direct charge readout electron radiography apparatus.

It is another object of the present invention to provide apparatus for optically scanning the improved apparatus incorporating the novel second electrode structure.

It is a further object of the present invention to provide a novel mesh structure for even further decreasing the device capacitance and increasing the output signal-to-noise ratio thereof.

These and other objects of the present invention will become apparent upon consideration of the following detailed description and the associated drawings.

BRIEF DESCRIPTION OF THE DRAWINGS

FIG. 1b is a sectional view through the prior art device along the lines and in the direction of arrows 1b—1b of FIG. 1a.

DETAILED DESCRIPTION OF THE INVENTION

Figure 1A:
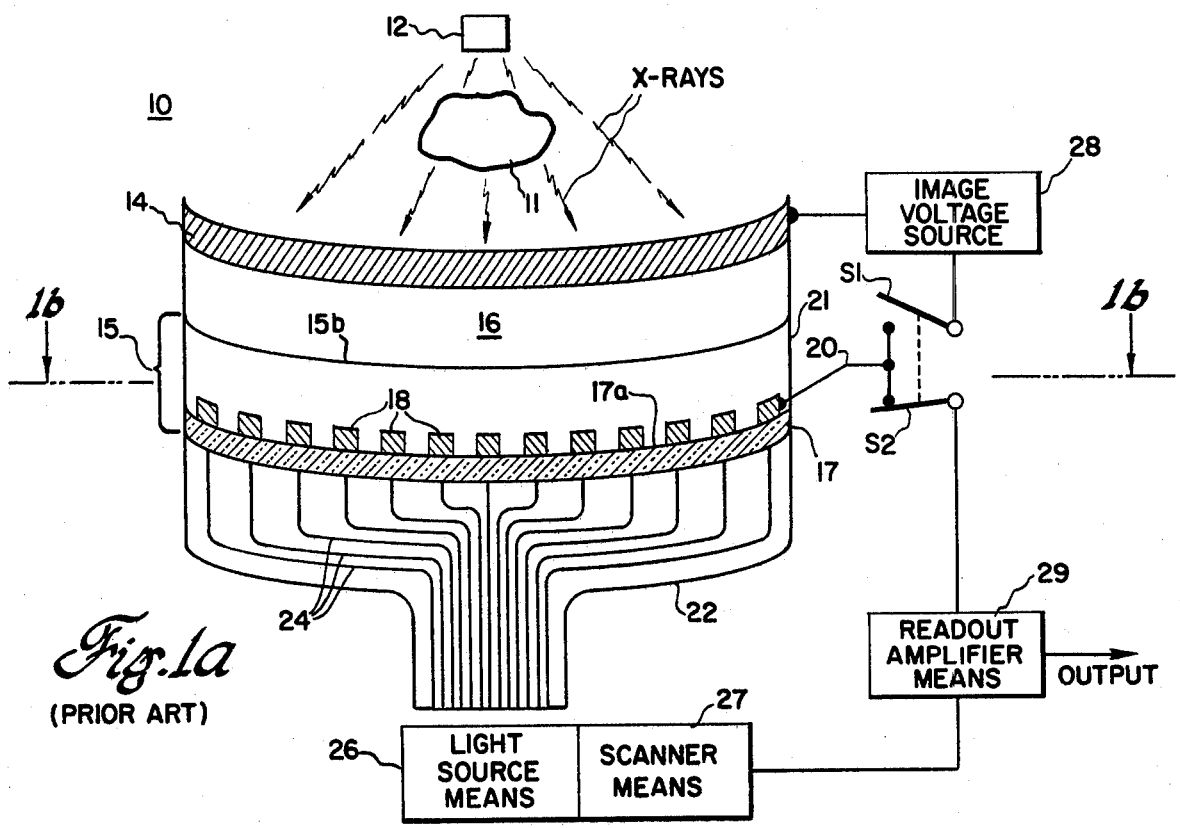
FIG. 1a is a sectional side view of one prior art electron radiographic device.
Figure 1B:
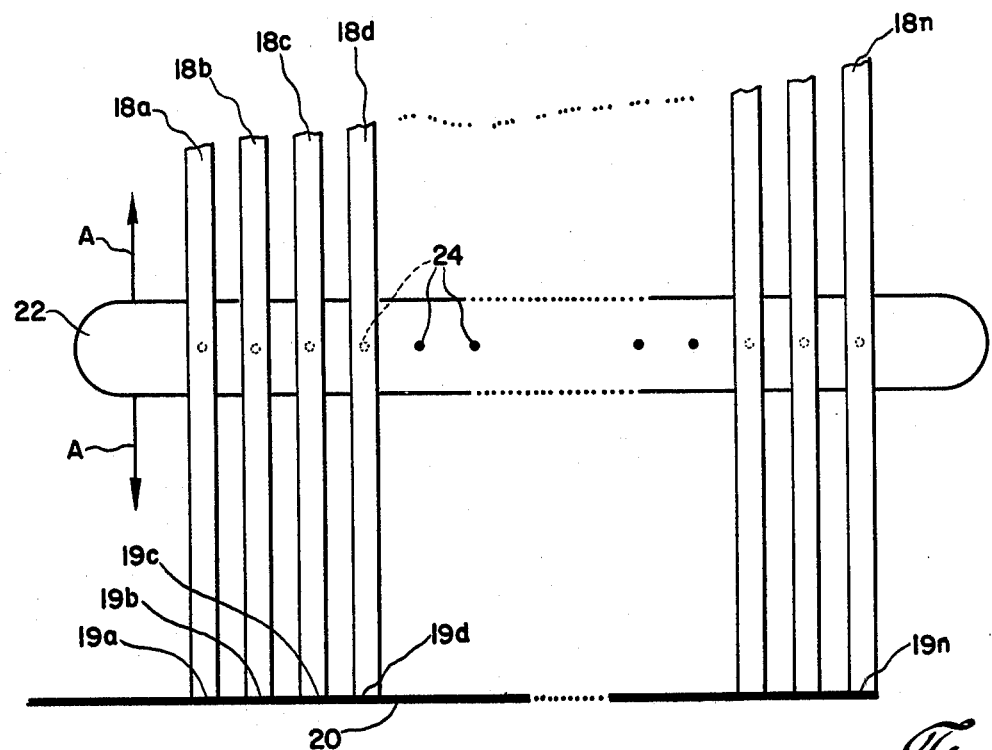

Referring initially to FIGS. 1a and 1b, prior art device 10, as more fully described in aforementioned U.S. Pat. No. 3,970,844, is utilized for forming a radiograph of an object 11 differentially absorbing X-rays from a source 12. Device 10 includes a first electrode 14 receiving the differentially-absorbed X-radiation. A second electrode 15 is arranged beyond first electrode 14 in a direction away from X-ray source 12. A chamber 16 is formed between the spaced-apart first and second electrodes 14 and 15, respectively, and is filled with a medium, such as a gas or liquid, for absorbing the X-radiation and for emitting electric charged particles such as ions and the like, responsive to the magnitude of the converted X-rays.

Second electrode 15 comprises a layer 17 of a transparent insulator, such as glass and the like, on the surface 17a of which a plurality of conductive, transparent strips 18a–18n, formed of tin oxide and the like, have been fabricated. A conductive means 20 couples like ends 19a–19n of each strips 18a–18n, respectively, together for connection to means external to device 10. A layer 21 of a photoconductive material is deposited over the strip and the remaining layer 17. A member 22 supports a plurality of optical fibers 24 disposed between a light source 26 and each of conductive strips 18. Member 22 and light source means 26 are caused to move in the direction of elongation of strips 18, as shown by arrows A—A, by a scanner means 27.

During X-ray exposure, a first switch means $S_1$ is closed to connect a source 28 of image voltage between first electrode 14 and, via common lead means 20, the plurality of conductive strips 18. The polarity of source 28 is such that the charges formed in the conversion medium contained in chamber 16 are drawn to the upper surface 15b of second electrode 15, i.e., the surface of layer 21 of photoconductive material, as a pattern of charge in the image of the object 11 to be analyzed. After exposure, first switch means $S_1$ is opened and a second switch means $S_2$, coupling a readout amplifier means 29 between common lead means 20 and scanner means 27, is closed. Light source 26 is activated and the light photons therefrom are conducted through each of fibers 24 and the associated overlying transparent strips 18 to impinge upon the photoconductor material of layer 21. The light photons change the conductivity of the region of layer 21 immediately overlying each one of the conductive strips, whereby the electrical charge residing at the second electrode upper surface 15b is transferred through the relatively high conductivity portions of photoconductive layer 21, the underlying conductive strip 18 and thence via common lead means 20 to readout amplifier means 29 to form the output signal. Thus, the photoconductor material is activated by the scanned light beam so that the magnitude of charge is transferred to the conductor material only when an area of layer 21 is illuminated by light source 26, as member 22 moves in the directions, indicated by arrows A, traverse to the elongated dimension of the plurality of conductor strips 18 (FIG. 1b).

Even if each of fibers 24 are sequentially illuminated, whereby the portion of layer 21 immediately above each one of elongated strips 18a–18n are sequentially illuminated at one position of member 22, the ends 19 of the remaining plurality of strips 18 are continuously coupled to common lead 20, whereby a relatively large area of thin insulator appears therebetween to form an electrical capacitance of relatively large magnitude in parallel with the desired signal output current caused to flow from the illuminated area. This relatively large output capacitance reduces the signal-to-noise ratio when medically practical X-ray dosages are utilized.

Figure 2:
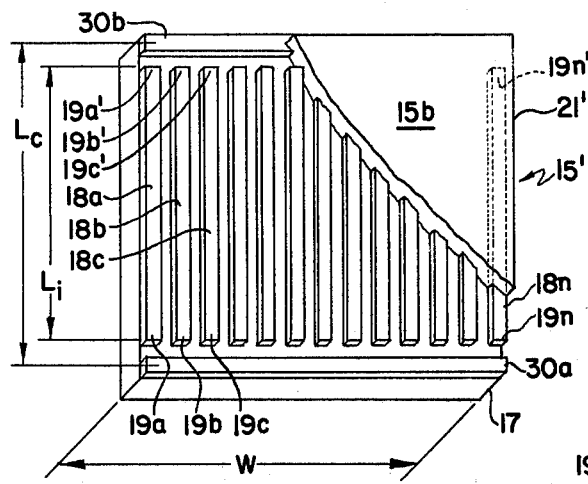
FIG. 2 is a partial-sectional oblique view of an improved second electrode in accordance with the principles of the present invention.
Figure 2A:
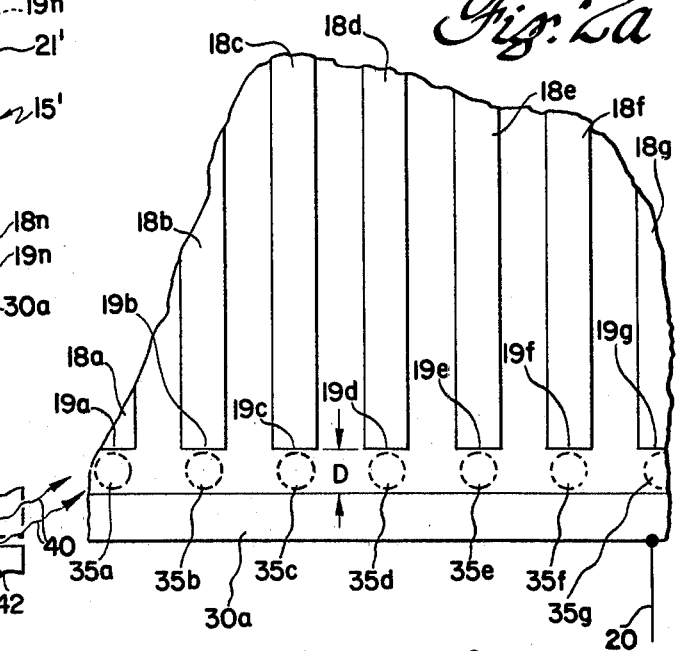
FIG. 2a is an expanded view of the improved second electrode of FIG. 2, illustrating the light-activatable switching areas.

Referring now to FIGS. 2 and 2a, we have found that the output capacitance may be reduced, and the signal-to-noise ratio increased by about two orders of magnitude, by the use of an improved second electrode 15'. The length of the transparent, insulative (glass) layer 17 is made longer than the length $L_i$ of each of the parallel strips 18a–18n. Each of a pair of thin transparent lead means, such as strips 30a and 30b, are fabricated transverse to the elongated dimension $L_i$ of strips 18 and spaced a distance D from the arrayed ends 19a–19n and 19a'–19n', respectively. Thus, the center-to-center length $L_c$ between strips 30 is greater than the sum of the length $L_i$ of strips 18 and twice the spacing distance D. Typically, if parallel strips 18 are each about 3 milli-inches wide and about 1000 A thick, with about a 1 milli-inch separation between adjacent ones of the strips, then each of strips 30 is between 4 and 10 milli-inches wide and has substantially the same thickness (about 1000 A) and a separation distance preferably between about 2 and 10 milli-inches. A layer 21' of photoconductive material, such as selenium and the like, covers only the area defined by width W and lead means-to-lead means length $L_C$; the actual area utilized to receive and store charge is defined by width W and strip length $L_i$. Layer 21' is fabricated to a maximum thickness on the order of 20 microns; any substantially thicker layer will broaden the output pulse height distribution, degrade the device output signal and lengthen total scanning time of the entire charge image.

Each of the areas 35a–35n respectively between lead means strip 30a and respective adjacent ones of strip ends 19a–19n (or between ends 19a'–19n' and the associated other adjacent lead means strip 30b) acts as an optically-activable switch. Thus, when an area, e.g. area 35f between lead strip 30 and end 19f of strip 18f, is not illuminated the photoconductive material of the area is in the highly resistive state, whereby charge can neither flow from the strip, e.g. 18f, to the lead means nor, from the lead means to a non-connected strip. The isolation of each non-interrogated strip reduces the effective capacitance of each strip in parallel connection to lead means strip 30. Thus, in the non-illuminated condition, the capacitance attributable to each strip is greatly reduced. When the area, e.g. area 35f, is illuminated the photoconductive material is placed in the highly conductive state, acting as a relatively low impedance betwen lead means strip 30 and the associated end, e.g. end 19f, of that one strip, e.g. strip 18f. Charge can now flow from the switch-connected strip (18f) to the "common" lead 30a and only the capacity of that strip is apparent at the device output (strip 30).

An X-ray exposure is accomplished by utilizing a light beam 40 to illuminate all of areas 35 between similarly disposed ends 19 of all of strips 18 and that lead means strip 30a to which conductor means 20 is attached. Beam 40 may be synthesized by illuminating a slit 41 formed between a pair of spaced-apart elongated members 42 disposed parallel to the elongated dimension of lead means strip 30a. Beam 40 thus causes each parallel strip 18 to be conductively coupled to lead means strip 30a and its associated conductor 20, whereby the potential of image voltage means 28 appears between top electrode 14 (FIG. 3) and the plurality of parallel conductor strips 18. It should be understood that the wavelength and intensity of light beam 40 are selected in such manner to create sufficient electron-hole pairs in the selenium of areas 35 to render the areas highly conducting; the remaining photoconductive area, defined by width W and a length slightly less than the length $L_l$ of the strips (as the ends 19 of the strips are illuminated by beam 40) remains non-illuminated and in an insulating state. The differentially-absorbed X-rays are thus converted into a charge image, which charge image is deposited upon the surface 15b of the photoconductive layer adjacent the gas filled gap 16.

Figure 2B:
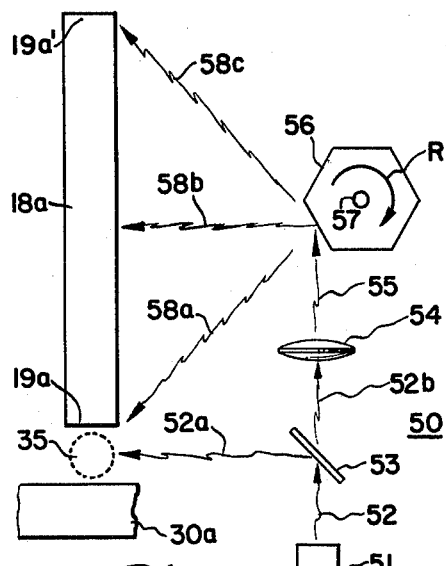
FIG. 2b is a schematic representation of optical apparatus for connection and scanning of a second electrode conductive strip.
Figure 3:
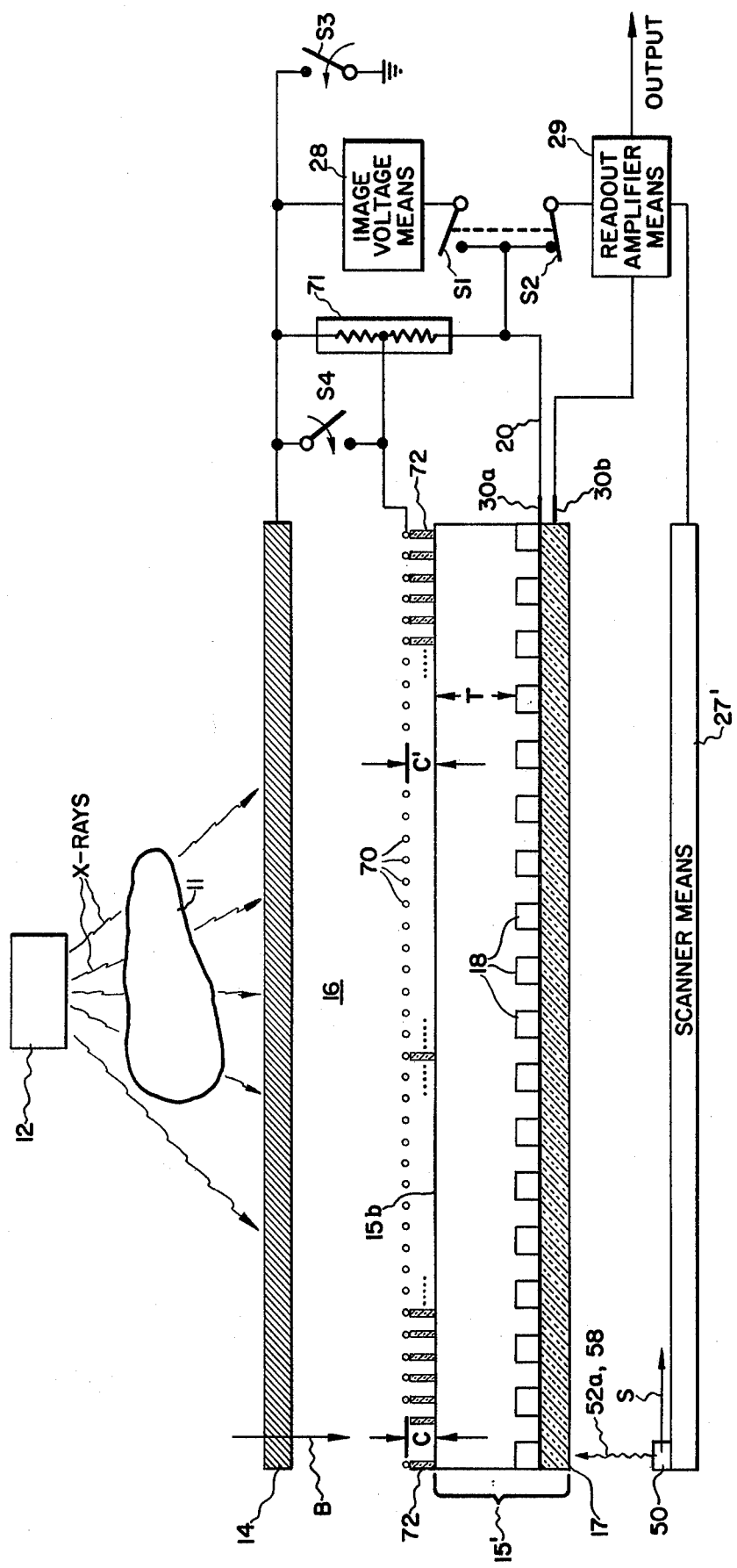
FIG. 3 is a side view of apparatus using the improved second electrode of the present invention.

Referring now to FIG. 3, wherein like reference designations are utilized, after X-ray exposure, first switch means $S_1$ opens and a third switch means $S_3$, not found in the prior art, is closed to connect first electrode 14 to electrical ground potential. First electrode 14 is also caused to move, in the direction of arrow B, toward the upper surface 15b of the photoconductive layer, as distinct from the stationary first electrode of the prior art, until the facing surfaces of first electrode 14 and upper photoconductivelayer surface 15b are separated by a distance C of less than about 25 microns. The illuminating light beam 40 (FIG. 2b) is now extinguished, whereby lead means strip 30a is again electrically isolated from each of the parallel strips 18.

The charge stored at surface 15b of the second electrode is read out by means of the scanning unit 50 shown in FIG. 2b. Scanning unit 50 comprises a light source means 51, such as a laser and the like, emitting a narrow beam 52 of light; a beam splitting means 53 is positioned so as to receive beam 52 and direct a portion 52a of the beam to illuminate one of areas 35 between a selected one of strip ends 19 and transverse strip 30a. The remaining portion 52b of the beam passes through splitting means 53 and is focussed by lens means 54 as a beam 55 of light impingent upon each sequential face of a multi-faceted mirror means 56, such as the hexagonal mirror illustrated in FIG. 2b, rotating in the direction of arrow R, e.g. clockwise, about a central pivot means 57. Light source 51, beam splitter 53, lens means 54 and rotating reflection means 56 are fixed, as by a platform (not shown for purposes of simplicity) in the same plane, which plane is parallel to the plane defined by the insulative layer 17 upon which the plurality of parallel strips 18 is fabricated. It should be understood that scanning means 50 replaces member 22, the plurality of optical fibers 24 and light source 26 of the prior art arrangement shown in FIGS. 1a and 1b.

The charge image is read out by initially moving scanning apparatus 50 to a point whereby beam portion 52a impinges upon the photoconductive layer area between transverse common strip 30a and a first one of strips 18, e.g. strip 18a (FIG. 2b). As mirror means 56 rotates, the focussed beam 55 is initially reflected as a beam 58a impingent upon one end, e.g. end 19a nearest strip 30a, of that strip, e.g. 18a, to be scanned. The charge magnitude stored adjacent end 19a is coupled through the illuminated (and thus conductive) overlying portion of photoconductive layer 21, through conductive strip 18, illuminated area 35a and transverse lead means strip 30a to the external readout amplifier means 29. As the mirror rotates, reflected beam 58 is moved along the length of elongated strip 18 towards the opposite end 19a' of strip 18a, for example, and causes the charge stored in that small area of the photoconductive layer immediately above the illuminated portion of the single strip to be read out via transverse lead means strip 30a. Thus, as the mirror rotates, the beam is moved to a position whereby the reflected beam 58b is impingent upon strip 18 approximately midway along its length and reads out the charge of the charge image stored immediately thereabove; further rotation causes the reflected beam 58c to finally be impingent upon opposite end 19a' of the strip to cause read out only of the charge stored in a small area immediately overlying the opposite end of the strip.

After a first strip is scanned, the platform holding scanning means 50 is mechanically shifted (FIG. 3) in the direction of arrow S transverse to the elongated dimension of strips 18 and parallel to the elongated dimension of lead means strips 30, by action of scanner means 27', whereby beam portion 52a is moved to impinge upon the next area 35, e.g. 38b, associated with the next adjacent parallel strip 35, e.g. 18b, which next strip is scanned from its first end 19b to its opposite end 19b'. Scanning means 27' sequentially shifts scanning apparatus 50 in direction S to direct its beam along the elongated dimension of each sequential strip 18 while the associated area 35 is illuminated to cause charge to be conducted to transverse lead means strip 30a. In this manner a two-dimensional scan across the charge-image-bearing photoconductive layer is accomplished. The scanned charge is discharged through a current-measuring operational amplifier 60 (FIG. 2c) in readout means 29 and the resulting electrical signals (including signals indicative of the strip being scanned and the scan position along that strip) may be handled by a remote data storage unit (not shown) which receives and stores the magnitude of charge of each sequential strip for processing, recordation and/or display. It should be understood that this charge readout mechanism may be utilized in any device having a charge image formed upon a surface, by any means whatever.

By use of parallel strips 18 coupled to transverse lead means strip 30a in sequential fashion, as by use of scanning means 50, the effective capacitance area coupled to the second electrode is reduced by about three orders of magnitude. A reduction in capacitance is necessary to stabilize the current-measuring operational amplifier 60.

The readable charge can be significantly increased by decreasing the gap distance C (FIG. 3) to the above-mentioned value of less than approximately 25 microns.

Figure 2C:
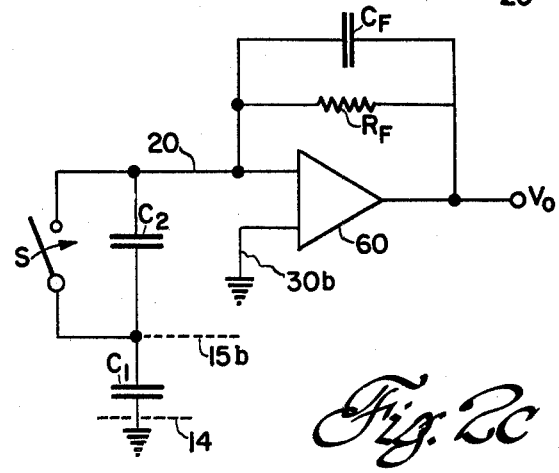
FIG. 2c is a schematic diagram of the equivalent output circuit of a device in accordance with FIG. 2, and of an amplifier utilized therewith, and useful in understanding the principles of the present invention.

The operation of our improved second electrode will be more clearly understood by referring now to FIG. 2c and considering the equivalent circuit of the device utilizing our improved second electrode 15'. A first equivalent capacitance $C_1$ is the capacitance between the upper electrode 14 (maintained at ground potential during charge readout) and the upper surface 15b of the photoconductive layer. The remaining capacitance $C_2$ is the equivalent capacitance between surface 15b and lead means 20. The respective equivalent capacitances $C_1$ and $C_2$ contain respective charge densities $\sigma_1$ and $\sigma_2$, where the total charge density $\sigma$ on the photoconductive layer is equal to the sum of $\sigma_1$ and $\sigma_2$, respectively. Illuminating a small area of photoconductive layer 21 by reflected beam 58 is equivalent to closing a switch S across the capacitance $C_2$ formed between photoconductive layer surface 15b and common lead means 20. Closure of switch S causes the charge density $\sigma_2$ thereof to dissipate through the switch while the charge density $\sigma_1$ of the other capacitance $C_1$ discharges through switch S to the input of the operational amplifier, completing the circuit for current flow. Thus, additional signal output current is achieved by increasing the value of the first capacitance $C_1$ and its associated charge density $\sigma_1$, which capacitance increase is facilitated by moving upper electrode 14 toward second electrode surface 15b until a separation distance C therebetween is achieved. The readable charge $\sigma_1$, flowing as a current to the input of operational amplifier means 60, is thus $\sigma_1 = (\sigma C_1)/(C_1 + C_2)$. The input current is converted to an amplifier output voltage $V_0$ and compensated for device capacitance by action of feedback capacitance $C_F$ and feedback resistance $R_F$, in known manner.

The movement of first electrode 14, prior to scan of the parallel strips 18 by means 50, may be dispensed with in a second preferred embodiment, shown in FIG. 3. In this embodiment, a conductive mesh 70, formed of a metallic material and the like, is permanently positioned a distance C' above upper surface 15b of the second electrode. The distance C' is on the order of (T/6.3), where T is the thickness of the photoconductive material above strips 18. During X-ray exposure, mesh 70 is held by coupling through a potential divider means 71 in parallel with source 28, at a potential, with respect to first electrode 14, somewhat less than the potential between the first and second electrodes 14 and 15, respectively. The magnitude of the mesh potential is adjusted for minimum effect on the quantity and resolution of the X-ray generated charge collected by second electrode 15'. After exposure but prior to removal of beam 40 and subsequent optical scanning of the second electrode, mesh screen 70 is connected to ground potential, as by closure of switch means $S_4$. It should be understood that the mesh is fine enough to preserve the desired resolution of the formed charge image and that the fine mesh may be supported above surface 15b of the photoconductive layer by fabricating an insulating supporting grid 72, of glass and the like, upon selenium surface 15b, with thickness on the order of distance C', to reduce generation of microphonic noise attributable to an unsupported mesh.

Figure 4:
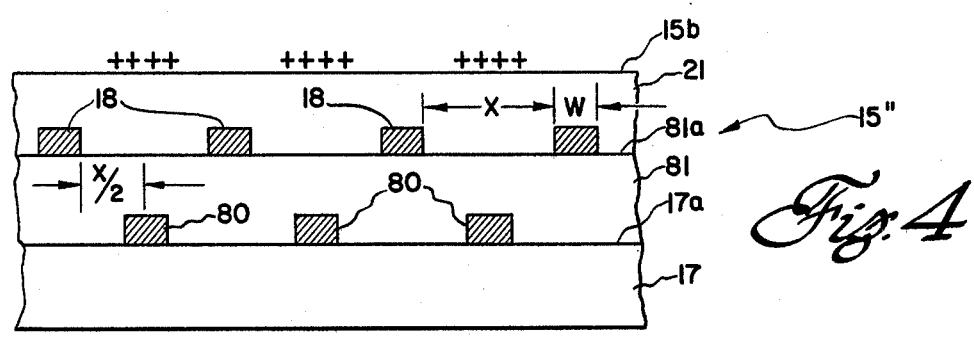
FIG. 4 is a sectional side view through another embodiment of the present invention utilizing a mesh electrode.

Referring now to FIG. 4, another preferred embodiment 15'' of an improved second electrode includes a plurality of mesh strips 80 fabricated upon the upper surface 17a of insulating layer 17, and "buried" within an additional insulating layer 81, also of glass and the like materials, fabricated thereon. The plurality of conductive and transparent strips 18 are fabricated upon the upper surface 81a of the additional insulating layer, in a fashion to be interdigitated between mesh strips 80 when viewed from above. In this embodiment conductive strips 18 may have a relatively small width in comparison with the strip-to-strip separation, e.g. the strips may have a width W on the order of 3 microns wide with a separation distance X on the order of 100 microns to further reduce the output capacitance seen by an amplifier. Mesh strips 80 are buried within the insulating layer formed by layers 81 and 17, whereby charge cannot flow into mesh strips 80 from the layers 21 of photoconductive material fabricated over parallel strips 18. During deposition of charge at the photoconductor layer upper surface 15b, responsive to the differentially-absorbed X-rays, the mesh strips 80 are held at a potential, relative to the parallel strips 18, whereby the charge collects primarily in the areas of surface 15b over mesh conductors 80, whereby the majority of counter charges, i.e. that charge at which the lines of force emanating from the collected charge terminate, is on mesh strips 80, rather than on the plurality of parallel strips 18 to realize the condition necessary for maximizing the readable charge. During scanning, the charge collected at surface 15b travels primarily parallel to the plane of that surface, rather than perpendicular to that plane as in the embodiments described hereinabove, to reach conductive strips 18. It should be understood that, as conductive strips 18 are narrow, they now need not be optically transparent as the charge will flow around the relatively narrow strips by carrier diffusion and at the end of excitation of each strip, the charge will have flowed from surface 15b to the strip and thence through the amplifier to ground potential. It should also be understood that this embodiment may result in some system simplification, as being utilizable without the plurality of photoelectric switching areas 35 (FIG. 2a) between sequential ones of strips 18 and the common transverse lead means strip 30a, if some signal-to-noise degradation is acceptable. However, for best signal-to-noise performance, optically-switchable areas 35 are utilized in the device. It should also be understood that the plurality of mesh strips 80 may be replaced by a continuous transparent conducting film deposited upon surface 17a of layer 17, for more easily fabricating the device and without significant change in the operational characteristics thereof, provided the relatively large separation-to-width relationships hereinabove set forth for parallel strips 18 is adhered to.

As an example, the improved second electrode of FIGS. 2 and 2a, when utilized in the prior art device, produced a signal-to-noise ratio of about 30, for a picture element having an area on the order of $10^{-4}$ cm$^2$, with an X-ray flux of about 1 mR. impinging on an imaging chamber 16 having material with a quantum absorption of about 30%. For a scanning means 50 scanning about $1 \times 10^6$ points per second, which scanning means 50 may utilize a laser (operating in the continuous or pulse mode), a flying spot TV scanner or the like, and with an amplifier bandwidth on the order of 1 MHz., the generated charge density of about 2 nC./cm.$^2$ generates a peak current on the order of 50 nanoamperes. Negligible deterioration of the signal-to-noise ratio of the charge image is found if the current-measuring amplifier (such as a Philbrick model Q25AH) has a current noise of less than 1 nanoampere with a 1

MHz. bandwidth. The resulting device-amplifier system contributes negligible amplifier noise even at X-ray dosage levels considerably below the 1 mR. level mentioned hereinabove, thus providing high signal-to-noise ratios with medically desirable exposure levels.

While the present invention has been described with respect to several preferred embodiments thereof, many variations and modifications will now become apparent to those skilled in the art. It is our intent, therefore, to be limited not by the scope of the present disclosure in, but only by the scope of the appending claims.

What is claimed is:

1. An improved direct charge readout electron radiography apparatus of the type having first electrode means receiving differentially-absorbed radiation, means for receiving the radiation passing through said first electrode for converting said radiation to a pattern of charged particles, second electrode means spaced from said first electrode means beyond said converting means for receiving said pattern of charged particles and means for reading the image of charged particles from said second electrode, wherein the improvement comprises said second electrode means including:
   a plurality of substantially parallel elongated strips of a transparent and conductive material, each strip having a first end;
   lead means spaced from said first end of each of said plurality of strips;
   first means overlaying at least said plurality of strips for storing said charge image until receipt of a first radiation stimulus; and
   a plurality of second means for electrically connecting only an associated one of said plurality of strips to said lead means, each of said second means separately responsive to receipt of a second radiation stimulus.

2. The improved apparatus of claim 1, further comprising an insulating layer supporting all of said plurality of strips and said lead means.

3. The improved apparatus of claim 2, wherein said insulative layer is formed of glass.

4. The improved apparatus of claim 1, wherein said first electrode means is spaced a first distance from said second electrode means during conversion of the differentially-absorbed radiation to said charge image, said first electrode means being adapted for movement to a second distance, less than said first distance, from said second electrode means after charge image formation and prior to reading charge from said second electrode means.

5. The improved apparatus of claim 1, further comprising a conductive mesh positioned between said first electrode means and said first means and adapted to be held at a potential with respect to the first electrode means less than the potential of said plurality of strips with respect to said first electrode means and to be electrically coupled to said first electrode means during charge image formation.

6. The improved apparatus of claim 5, further comprising insulative means positioned between said conductive mesh and first means for supporting said mesh.

7. The improved apparatus of claim 1, further comprising a plurality of substantially parallel mesh strips, each strip being positioned between a pair of adjacent ones of said plurality of conductive strips and spaced further from said electrode means than said conductive strips; and a grid of insulative material supporting said mesh strips beyond said plurality of strips; said mesh strips being adapted to be held at a first potential relative to the conductive strips to facilitate collection of charge in those regions of said first means closest to said first electrode means and essentially only over said mesh strips.

8. The improved apparatus of claim 7, wherein said mesh strips form a substantially continuous layer of conductive material.

9. The improved apparatus of claim 1, wherein said first radiation stimulus comprises a first beam of radiation sequentially scanned along the elongated dimension of each of said plurality of strips; and said second radiation stimulus comprises a second beam of radiation illuminating only the area between said lead means and the first end of that one strip being scanned by said first beam.

10. The improved apparatus as set forth in claim 9, wherein said image reading means simultaneously supplies first and second beam of radiation.

11. The improved apparatus as set forth in claim 10, wherein said image reading means comprises:
   source means for emitting a beam of said radiation;
   means for splitting said beam into said second beam and another beam; and
   means for scanning said another beam sequentially along each elongated strip.

12. The improved apparatus as set forth in claim 11, wherein said beam scanning means is a rotating mirror receiving said another beam from a first direction and reflecting said another beam as said first beam through a range of directions different from said first direction and selected to cause said first beam to scan the length of each elongated strip.

13. The improved apparatus of claim 11, further comprising means for sequentially moving said image reading means to simultaneously illuminate each sequential one of said plurality of parallel strips and only that one of said second means associated therewith.

14. The improved apparatus of claim 1, wherein each of said second means is a first layer of photoconductive material overlaying the area between a strip first end and said lead means, the photoconductive material of said area having respectively a relatively low electrical impedance and a relatively high electrical impedance responsive respectively to illumination and non-illumination of that area by said second radiation stimulus.

15. The improved apparatus of claim 14, wherein all of said areas are coextensive in said first layer, said second radiation stimulus being adapted to illuminate only those of said areas to be switched to the low impedance condition.

16. The improved apparatus of claim 14, wherein said second radiation stimulus is a beam of light photons.

17. The improved apparatus of claim 16, wherein said photoconductive material is selenium.

18. The improved apparatus of claim 14, wherein said lead means is an elongated conductive strip positioned with its direction of elongation essentially transverse to the elongated dimension of each strip and spaced from the first end each thereof.

19. The improved apparatus of claim 18, wherein said first means is a layer of photoconductive material.

20. The improved apparatus of claim 19, wherein the photoconductive material is selenium.

21. The improved apparatus of claim 18, wherein a single layer of photoconductive material overlays all of said plurality of strips and includes each of the areas between said lead means and each first end of each one of said plurality of strips.

22. The improved apparatus of claim 21, wherein said transparent and conductive strips are formed of tin oxide.

23. An improved direct charge readout electron radiography apparatus of the type having first electrode means receiving differentially-absorbed radiation, means for receiving the radiation passing through said first electrode for converting said radiation to a pattern of charged particles, second electrode means spaced from said first electrode means beyond said converting means for receiving said pattern of charged particles and means for reading the image of charged particles from said second electrode, wherein the improvement comprises said second electrode means including:
 a plurality of substantially parallel elongated strips of a conductive material, each strip having a first end;
 lead means spaced from said first end of each of said plurality of strips;
 first means overlaying at least said plurality of strips for storing said charge image until receipt of a first radiation stimulus;
 a plurality of second means for electrically connecting only an associated one of said plurality of strips to said lead means, each of said second means separately responsive to receipt of a second radiation stimulus;
 a plurality of substantially parallel mesh strips, each strip being positioned between a pair of adjacent ones of said first electrode means than said conductive strips; and
 said mesh strps being adapted to be held at a first potential relative to the conductive strips to facilitate collection of charge in those regions of said first means closest to said first electrode means and essentially only over said mesh strips.

24. The improved apparatus of claim 23, wherein each of said second means is a first layer of photoconductive material overlaying the area between a strip first end and said lead means, the photoconductive material of said area having respectively a relatively low electrical impedance and a relatively high electrical impedance responsive respectively to illumination and non-illumination of that area by said second radiation stimulus.

25. The improved apparatus of claim 24, wherein all of said areas are coextensive in said first layer, said second radiation stimulus being adapted to illuminate only those of said areas to be switched to the low impedance condition.

26. The improved apparatus of claim 24, wherein said second radiation stimulus is a beam of light photons.

27. The improved apparatus of claim 26, wherein said photoconductive material is selenium.

28. The improved apparatus of claim 24, wherein said lead means is an elongated conductive strip positioned with its direction of elongation essentially transverse to the elongated dimension of each strip and spaced from the first end each thereof.

29. The improved apparatus of claim 28, wherein said first means is a layer of photoconductive material.

30. The improved apparatus of claim 29, wherein the photoconductive material is selenium.

31. The improved apparatus of claim 28, wherein a single layer of photoconductive material overlays all of said plurality of strips and includes each of the areas between said lead means and each first end of each one of said plurality.

32. The improved apparatus of claim 31, wherein said transparent and conductive strips are formed of tin oxide.

33. The improved apparatus of claim 23, further comprising an insulating layer supporting all of said plurality of strips and said lead means.

34. The improved apparatus of claim 33, wherein said insulative layer is formed of glass.

35. The improved apparatus of claim 23, wherein said first radiation stimulus comprises a first beam of radiation sequentially scanned along the elongated dimension of each of said plurality of strips; and said second radiation stimulus comprises a second beam of radiation illuminating only the area between said lead means and the first end of that one strip being scanned by said first beam.

36. The improved apparatus as set forth in claim 35, wherein said image reading means simultaneously supplies first and second beams of radiation.

37. The improved apparatus as set forth in claim 36, wherein said image reading means comprises:
 source means for emitting a beam of said radiation;
 means for splitting said beam into said second beam and another beam; and
 means for scanning said another beam sequentially along each elongated strip.

38. The improved apparatus as set forth in claim 37, wherein said beam scanning means is a rotating mirror receiving said another beam from a first direction and reflecting said another beam as said first beam through a range of directions different from said first direction and selected to cause said first beam to scan the length of each elongated strip.

39. The improved apparatus of claim 37, further comprising means for sequentially moving said image reading means to simultaneously illuminate each sequential one of said plurality of parallel strips and only that one of said second means associated therewith.

* * * * *